United States Patent [19]

Roberts

[11] 3,940,869

[45] Mar. 2, 1976

[54] ARTIFICIAL FISHING LURE

[76] Inventor: Eldon E. Roberts, 13400 E. Whittier Blvd., Suite C., Whittier, Calif. 90605

[22] Filed: Aug. 21, 1974

[21] Appl. No.: 499,169

[52] U.S. Cl. ............. 43/42.53; 43/42.24; 43/42.34
[51] Int. Cl.² ........................................ A01K 85/00
[58] Field of Search............ 43/42.53, 42.24, 42.34; 46/156

[56] References Cited
UNITED STATES PATENTS

| | | | |
|---|---|---|---|
| 2,547,240 | 4/1951 | Young et al. | 43/42.34 |
| 2,563,825 | 8/1951 | Ebert | 43/42.24 |
| 2,765,571 | 10/1956 | Sinclair | 43/42.34 |
| 2,952,462 | 9/1960 | Planin | 46/156 X |

Primary Examiner—Louis G. Mancene
Assistant Examiner—Daniel J. Leach
Attorney, Agent, or Firm—Edgar W. Averill, Jr.

[57] ABSTRACT

An artificial lure and process for forming same is disclosed herein. The lure results from the steps of cutting a strip from a sheet of compressed cellular material or sponge of the type which expands to at least twice its thickness when added to water. A fishing hook is inserted into the compressed dehydrated material and the combination is immersed in water which causes the compressed dehydrated material to expand to form an artificial fishing lure. The sponge may be cut into a simple elongated rectangle or may contain one or more curves to enhance the movement of the lure in water. A fish attracting substance may be added to the water prior to the expansion step. The use of compressed cellulosic sponge of the type which expands to approximately eight times its original thickness after immersion in water is also disclosed herein.

12 Claims, 5 Drawing Figures

U.S. Patent   March 2, 1976   3,940,869
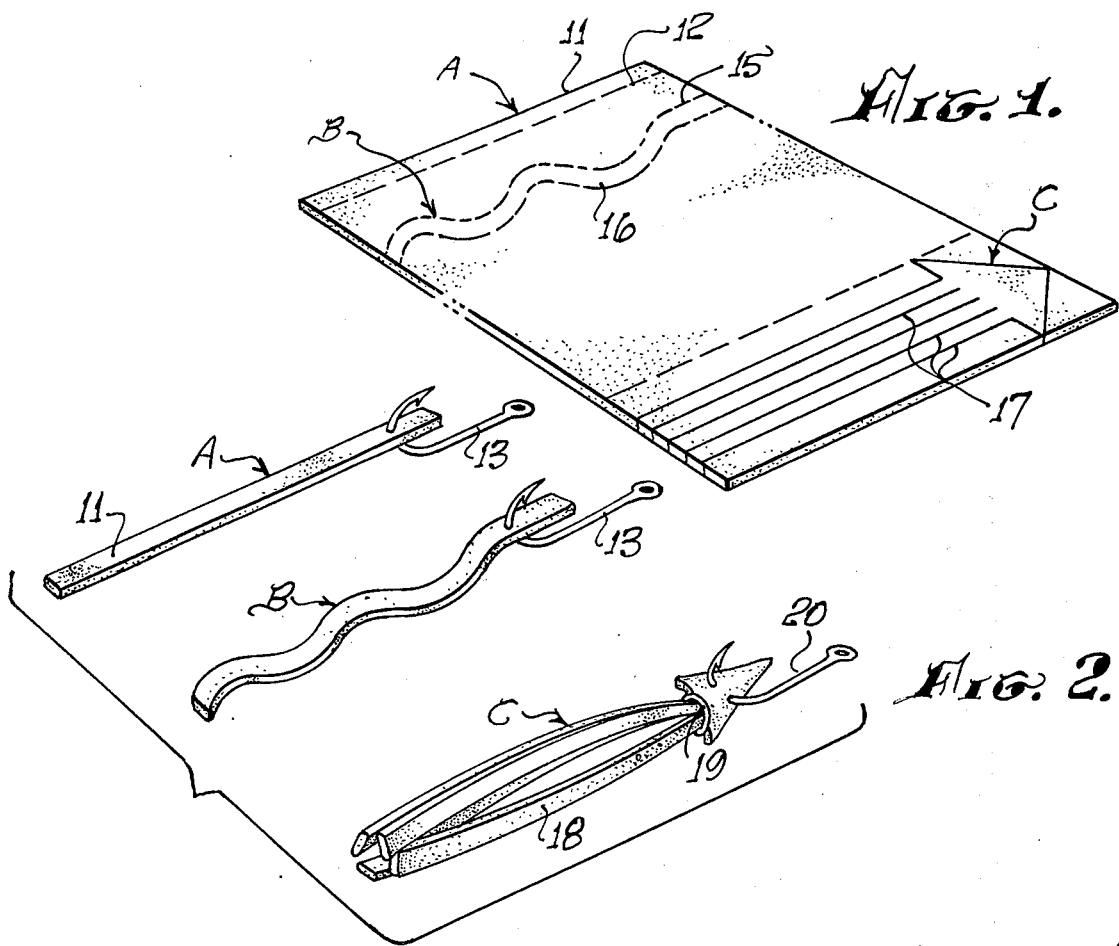
Fig. 1.
Fig. 2.
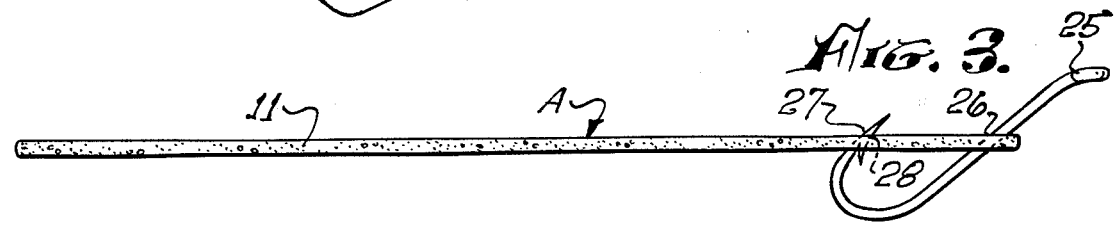
Fig. 3.
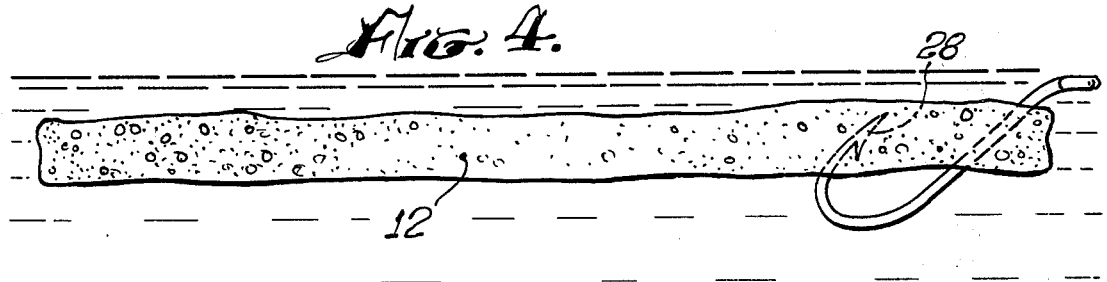
Fig. 4.
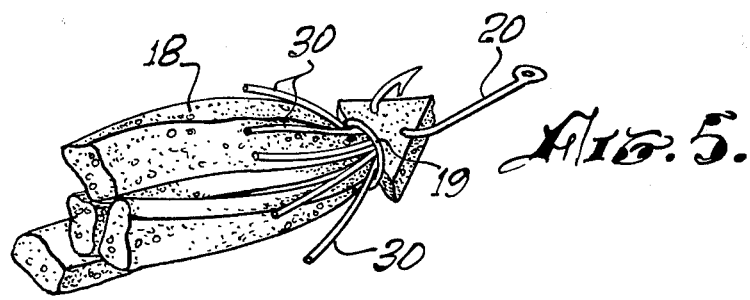
Fig. 5.

ARTIFICIAL FISHING LURE

BACKGROUND OF THE INVENTION

The field of the invention is artificial fishing lures and the invention more particularly relates to fishing lures which resemble a worm, minnow, squid or other natural bait, many of which have a relatively high water content in the natural state. The use of polyvinyl chloride plastisol to form artificial worms is well known and these artificial worms have been widely used in sport fishing. Various means have been used to embed one or more hooks in such artificial worms, and fish attracting substances have also been added to some plastic worms as well as to other types of artificial lures in order to improve their fish attracting characteristics.

There are perhaps few fields which have generated the imagination and variety of articles as that of artificial lures for fishing. Many of such attempts have resulted in lures of relatively high cost and of relatively low effectiveness. External hooks on some artificial lures create the problem of snagging on underwater objects such as logs or rocks and yet most attempts to eliminate this problem substantially decrease the ability of the lure to carry out its prime function of securing a fish.

SUMMARY OF THE INVENTION

The present invention is for a process for forming an artificial fishing lure comprising the steps of cutting a shaped strip from a sheet of compressed dehydrated sponge of the type which expands to at least twice its original thickness when immersed in water. A fishing hook is inserted into the strip, and the strip and hook are inserted in water whereby the compressed sponge expands about at least a portion of the hook if not completely covering the hook. The material may be cut into a simple elongated rectangle or may be cut to various bait imitation shapes with one or more curves, which tend to enhance the movement of the lure through the water and better simulate the natural food of fish found in both fresh and salt water. By adding a fish attracting substance to the water prior to the immersion step, the lure may be permeated with a fish attracting substance which is retained in the pores of the sponge for long periods of time. The use of compressed and dehydrated cellulosic sponge of the type which expands four to eight times its origianl thickness is particularly effective. After expansion the resulting sponge is largely composed of water and forms a soft surrounding for at least a portion of the fish hook and yet readily gives way when the lure is inhaled or otherwise attacked or swallowed by a fish. Such lures may be formed from a plurality of strips and the hook may be inserted through the sponge in a plurality of places, depending upon the artificial bait being simulated whether this be of a worm, crawfish or minnow, etc.

BRIEF DESCRIPTION OF THE DRAWINGS

FIG. 1 is a perspective view of a compressed dehydrated sponge.

FIG. 2 is a perspective view of strips cut from the compressed dehydrated sponge of FIG. 1.

FIG. 3 is an enlarged side elevation of one of the strips of FIG. 2.

FIG. 4 is a side elevation of the strip of FIG. 3 after immersion in a water containing fluid.

FIG. 5 is a perspective view of one of the articles of FIG. 2 after immersion in a water containing liquid.

DESCRIPTION OF THE PREFERRED EMBODIMENTS

As shown in FIG. 1, a sheet of compressed dehydrated sponge generally indicated by reference character 10 is marked with a plurality of lines along which the sponge will be cut to form the artificial lures shown in FIG. 2. A sponge may be formed from any compressed and dehydrated water absorbing material which has the capabilities of expanding to at least twice its original thickness when immersed in water. An especially effective material is compressed dehydrated cellulose sponge and sponges of this type are capable of expanding up to eight times their original thickness upon immersion in water. Such sponges are commercially available and are used for advertising novelties and other uses where their remarkable ability to expand in water is useful.

An elongated rectangle 11 is formed by cutting sheet 10 along line 12. In order to form a fish lure a hook 13 is inserted through rectangle 11 and the sponge and hook are immersed in water. The use of a highly water absorbent sponge further permits the imbibing and holding of a fish attracting substance by immersing the compressed sponge in water which contains such a substance. In this way the substance is completely absorbed and is held with a remarkable degree of permanence within the expanded lure. This immersion step does not require squeezing of the sponge with its inherent danger of injury from the fish hook. The use of a fish attracting substance is not essential, however, for the practice of the present invention. The sheet may also be cut in the shape of a minnow or other natural shape.

The expanded lure has a very high water content, together with high flexibility and as a result tends to move in a highly natural manner through the water. Furthermore, when a cellulosic sponge is used the pores help to hold the lure in a fish's mouth for an instant longer than commonly used lures and this greatly enhances the ability of the lure to securely hook the fish.

The compressed and dehydrated sheet may be readily printed or marked in a manner to resemble natural bait or to mark the lure with advertising or other indicia.

By cutting sheet 10 along the multi-curved lines 15 and 16 a curved lure results and the movement and flexibility of the lure in the water is enhanced. By cutting sheet 10 along a plurality of lines indicated by reference character 17, an artificial squid may be formed. Such a lure is shown in FIG. 2 and indicated by reference character 18. A wire or other tie 19 may be made around the uncut end of lure 18 either before or after insertion of hook 20. Lure 18 is shown after immersion in water in FIG. 5 and, as is there plainly shown, hook 20 is largely surrounded by the expanded lure 18.

Lure 11 is shown in enlarged side elevation in FIG. 3 where a hook 25 is inserted through rectangle 11 in two places indicated by reference characters 26 and 27. The lure of FIG. 3 is shown after immersion in water in FIG. 4 and the result is a lure which tends to be weedless since the barb 28 is largely surrounded by the expanded sponge.

The lure of the present invention may be flavored with such fish attracting substances as anise oil, fish oil, anchovy flavor or the like. While the lures of the present invention tend to have a natural movement caused by their flexibility, this movement may be enhanced by wrapping such lures with one or more strips of a reflective substance, such as metal foil or metallic coated Mylar. Such an addition is shown in FIG. 5 and indicated by reference character 30 representing a plurality of strips of metallic coated Mylar.

It has been postulated that fish are motivated to strike a lure for five basic reasons. The fish may be hungry, curious, playful or protective, and may also take the lure in a reflex action. It is believed that the lures of the present invention are effective because they may be formed into shapes which resemble the natural food of fish in both fresh water and salt water or when combined with flashing metallic strips give rise to the fish's curiosity or protective instincts. The lure has been found effective in both fresh and salt water fishing.

The compressed dehydrated sponges may be made in essentially any color and also can be printed or marked with dots, stripes, advertising indicia or the like. Such lures may also be used in either fresh or salt water and may be made in a wide variety of sizes. Compressed and dehydrated sponges are commercially available in thicknesses including 5/16, ½, ¾, ⅝, 1 and 2 after expansion. Compressed and dehydrated cellulose is an inexpensive material and thus permits a low cost fishing lure. Since the compressed cellulose is relatively thin prior to expansion the lure before expansion may be very compact and easily packaged. Further, by placing the fish hook into the sponge prior to expansion, the hook tends to be disguised after expansion.

The present embodiments of this invention are to be considered in all respects as illustrative and not restrictive, the scope of the invention being indicated by the appended claims rather than by the foregoing description. All changes which come within the meaning and range of equivalency of the claims therefore are intended to be embraced therein.

I claim:

1. A process for forming an artificial fishing lure comprising:
   cutting a piece from a sheet of compressed dehydrated sponge of the type which expands to at least twice it original thickness when water is added thereto;
   inserting at least one fishing hook into said piece; and
   immersing said piece and hook into water whereby said compressed sponge expands.

2. The process of claim 1 wherein said piece is an elongated rectangle.

3. The process of claim 1 wherein said piece is an elongated length having at least one arcuate curve therein.

4. The process of claim 1 further including the step of adding a fish attracting substance to said water prior to said immersing step.

5. The process of claim 1 wherein said compressed sponge is a cellulosic sponge.

6. The process of claim 1 wherein said sponge expands in thickness at least four times its original thickness after immersion in water.

7. The process of claim 1 wherein said sponge expands in thickness about 8 times its original thickness after immersion in water.

8. The process of claim 1 further including the step of affixing a plurality of said pieces of said fish hook.

9. The process of claim 1 further including the step of affixing at least one reflective member to said strip or shape.

10. The process of claim 9 wherein a plurality of said members are affixed to said strip.

11. The process for forming an artificial fishing lure having fish hooks means affixed thereto, said process comprising:
    cutting at least one article from a sheet of compressed sponge;
    inserting at least one fish hook through said article at a plurality of places;
    immersing said article in a water containing liquid.

12. The process of claim 11 wherein said water containing liquid has a fish attracting substance therein.

* * * * *